United States Patent
Pilavdzic et al.

(10) Patent No.: US 6,717,118 B2
(45) Date of Patent: Apr. 6, 2004

(54) APPARATUS FOR INDUCTIVE AND RESISTIVE HEATING OF AN OBJECT

(75) Inventors: Jim Izudin Pilavdzic, Milton, VT (US); Stefan Von Buren, Colchester, VT (US); Valery G. Kagan, Colchester, VT (US)

(73) Assignee: Husky Injection Molding Systems, LTD, Bolton (CA)

( * ) Notice: Subject to any disclaimer, the term of this patent is extended or adjusted under 35 U.S.C. 154(b) by 0 days.

(21) Appl. No.: 10/327,442

(22) Filed: Dec. 21, 2002

(65) Prior Publication Data

US 2003/0121908 A1 Jul. 3, 2003

Related U.S. Application Data

(63) Continuation-in-part of application No. 09/891,826, filed on Jun. 26, 2001.

(51) Int. Cl.$^7$ .............................................. H05B 6/02
(52) U.S. Cl. ........................................ 219/601; 219/628
(58) Field of Search ............................. 219/601, 628–630, 219/656, 660, 635, 672, 674

(56) References Cited

U.S. PATENT DOCUMENTS

| | | |
|---|---|---|
| 1,771,918 A | 7/1930 | Fry |
| 2,163,993 A | 6/1939 | Dufour et al. |
| 3,440,384 A | 4/1969 | Schroeder |
| 3,708,645 A | 1/1973 | Osborn, Jr. |
| 3,989,916 A | 11/1976 | Amagami et al. |
| 4,256,945 A | 3/1981 | Carter et al. |
| 4,521,659 A | 6/1985 | Buckley et al. |
| 4,599,061 A | 7/1986 | Manabe et al. |
| 4,726,751 A | 2/1988 | Shibata et al. |
| 4,788,394 A | 11/1988 | Vanneste et al. |
| 4,798,926 A | 1/1989 | Sakai |
| 4,814,567 A | 3/1989 | De Angelis et al. |
| 4,874,916 A | 10/1989 | Burke |
| 4,940,870 A | 7/1990 | Shibata et al. |
| 4,948,466 A  * | 8/1990 | Jaakkola ..................... 219/619 |
| 5,061,415 A | 10/1991 | Depcik |
| 5,061,835 A | 10/1991 | Iguchi |

(List continued on next page.)

FOREIGN PATENT DOCUMENTS

| | | |
|---|---|---|
| EP | 1 006 757 A2 | 7/2000 |
| FR | 1456221 | 5/1966 |
| GB | 772424 | 4/1957 |
| JP | 1996-8051 | 1/1996 |
| WO | WO 98/00274 | 1/1998 |

OTHER PUBLICATIONS

"Design News" magazine dated Sep. 26, 1994 pp. 109–110 article titled "Litz Wire Boosts Induction Heater's Efficiency".

"Industrial Heating" magazine dated Apr. 1994 article titled "Radio Frequency Heating Using Litz Wire Technology for Semiconductor Wafer Processing" by Charles Haldeman and Brian Ahern.

PCT International Search Report for International Application No. PCT/CA 02/00534 dated Aug. 1, 2002.

Primary Examiner—Tu Ba Hoang
(74) Attorney, Agent, or Firm—Steven J. Kotula

(57) ABSTRACT

An apparatus for heating a flowable material comprises a core having a passageway formed therein for the communication of the flowable material, and an electric element coiled in multiple turns against the core in a helical pattern. The electric element, in use, heats the core both resistively and inductively. The electric element has no auxiliary cooling capacity. The electric element may be installed against the outside of the core, with an optional ferromagnetic yoke installed over it, or it may be installed against the inside of the core, embedded in a wear-resistant liner. The yoke and liner may be metallic material deposited such as by hot-spray technology and finished smooth.

26 Claims, 12 Drawing Sheets

U.S. PATENT DOCUMENTS

| | | |
|---|---|---|
| 5,176,839 A | 1/1993 | Kim |
| 5,216,215 A | 6/1993 | Walker et al. |
| 5,315,085 A | 5/1994 | Ferguson |
| 5,439,047 A | 8/1995 | Eckert |
| 5,444,229 A | 8/1995 | Rudolph et al. |
| 5,461,215 A | 10/1995 | Haldeman |
| 5,547,717 A | 8/1996 | Scaringella et al. |
| 5,571,436 A | 11/1996 | Gregg et al. |
| 5,580,479 A | 12/1996 | Bruns |
| 5,762,972 A | 6/1998 | Byon |
| 5,799,720 A | 9/1998 | Ross et al. |
| 5,973,296 A | 10/1999 | Juliano et al. |
| 5,979,506 A | 11/1999 | Aarseth |

* cited by examiner

| Design Criteria | Inductive Heater (FIG.2) | Resistive Heater (FIG.1) | Combo Heater (FIG.3) |
|---|---|---|---|
| Placement of coil. | Spaced away from heated article. | Wrapped around heated article. | Placed inside grooves of heated article to provide closed magnetic path. |
| Coil resistance | Low (ie. Cu) | High (ie. NiCr) | High (ie. NiCr) |
| Thermal Communication of Coil with Heated Article. | No-coil heat is removed by special cooling. | Yes-coil heat is conducted to article. | Yes-heat is conducted to article and no special cooling required. |
| Power Supply Characteristics. | High Frequency-resonance filter required. | Line Frequency-no filter required. | High Frequency-no resonance filter required. |
| Max. Heating Power. | $P_I = I^2_{I(max)} \times R_{eq}$ | $P_I = I^2_{R(max)} \times R_R$ | $P_{combo(max)} = P_{R(max)} + P_{I(max)}$ |
| Min. Time of Heating. | $t_{I(min)} = (cMDT)/P_{I(max)}$ | $t_{R(min)} = (cMDT)P_{R(max)}$ | $t_{combo(min)} = (cMDT)/(P_{R(max)} + P_{I(max)})$ |
| Coil Energy Losses. | $P_{I(loss)} = (I^2_{I(max)}R_c) + P_{(cool\,sys)}$ | $P_{R(loss)} = 0$ | $P_{combo(loss)} = 0$ |

FIG. 5

APPARATUS FOR INDUCTIVE AND RESISTIVE HEATING OF AN OBJECT

This is a continuation-in-part application of co-pending application Ser. No. 09/891,826 filed Jun. 26, 2001, the contents of which are therefore incorporated herein by reference.

BACKGROUND OF THE INVENTION

This invention relates to an apparatus for heating an object. More particularly, this invention relates to an apparatus that heats an object both inductively and resistively. The invention is particularly useful for heating large tubular objects, such as barrels and nozzles of machinery, such as extruders and injection molding machines, for processing molten material, such as plastic and metal.

Referring to FIG. 1, a typical resistive heater circuit 10 in accordance with the prior art is shown. A power supply 12 may provide a DC or AC voltage, typically line frequency to a heater coil 14 which is wrapped around in close proximity to a heated article 20. Typically, the heater coil 14 is made up of an electrically resistive element with an insulation layer 18 applied to prevent it from shorting out. It is also common to have the entire heater coil encased in a cover 16 to form a modular heating subassembly. The prior art is replete with examples of ways to apply heat to material and raise the temperature of the heated article 20 to a predetermined level. Most of these examples center around the use of resistive or ohmic heat generators that are in mechanical and thermal communication with the article to be heated.

Resistive heaters are the predominate method used today. Resistive heat is generated by the ohmic or resistive losses that occur when current flows through a wire. The heat generated in the coil of the resistive type heater must then be transmitted to the workpice by conduction or radiation. The use and construction of resistive heaters is well known and in most cases is easier and cheaper to use than inductive heaters. Most resistive heaters are made from helically wound coils, wrapped onto a form, or formed into sinuous loop elements.

A typical invention using a resistive type heater can be found in U.S. Pat. No. 5,973,296 to Juliano et al. which teaches a thick film heater apparatus that generates heat through ohmic losses in a resistive trace that is printed on the surface of a cylindrical substrate. The heat generated by the ohmic losses is transferred to molten plastic in a nozzle to maintain the plastic in a free flowing state. While resistive type heaters are relatively inexpensive, they have some considerable drawbacks. Close tolerance fits, hot spots, oxidation of the coil and slower heat up times are just a few. For this method of heating, the maximum heating power can not exceed $P_{R(max)}=(I_{R(max)})^2 \times R_c$, where $I_{R(max)}$ is equal to the maximum current the resistive wire can carry and $R_c$ is the resistance of the coil. In addition, minimum time to heat up a particular article is governed by $t_{R(min)}=(cM\Delta T)/P_{R(max)}$, where c is the specific heat of the article, M is the mass of the article and $\Delta T$ is the change in temperature desired. For resistive heating, total energy losses at the heater coil is essentially equal to zero because all of the energy from the power supply that enters the coil is converted to heat energy, therefore $P_{R(losses)}=0$.

Now referring to FIG. 2, a typical induction heating circuit 30 according to the prior art is shown. A variable frequency AC power supply 32 is connected in parallel to a tuning capacitor 34. Tuning capacitor 34 makes up for the reactive losses in the load and minimizes any such losses. Induction heater coil 36 is typically comprised of a hollow copper tube, having an electrically insulating coating 18 applied to its outer surface and a cooling fluid 39 running inside the tube. The cooling fluid 39 is communicated to a cooling system 38 to remove heat away from the induction heater coil 36. The heater coil 36 is not generally in contact with the article to be heated 20. As the current flows through the coil 36, lines of magnetic flux are created as depicted by arrows 40a and 40b.

Induction heating is a method of heating electrically conducting materials with alternating current (AC) electric power. Alternating current electric power is applied to an electrical conducting coil, like copper, to create an alternating magnetic field. This alternating magnetic field induces alternating electric voltages and current in a workpiece that is closely coupled to the coil. These alternating currents generate electrical resistance losses and thereby heat the workpiece. Therefore, an important characteristic of induction heating is the ability to deliver heat into electrical conductive materials without direct contact between the heating element and the workpiece.

If an alternating current flows through a coil, a magnetic field is produced that varies with the amount of current. If an electrically conductive load is placed inside the coil, eddy currents will be induced inside the load. The eddy currents will flow in a direction opposite to the current flow in the coil. These induced currents in the load produce a magnetic field in the direction opposite to the field produced by the coil and prevent the field from penetrating to the center of the load. The eddy currents are therefore concentrated at the surface of the load an decrease dramatically towards the center. As shown in FIG. 3A, the induction heater coil 36 is wrapped around a cylindrical heated body 20. The current density $J_x$ is shown by line 41 of the graph. As a result of this phenomenon, almost all the current is generated in the area 22 of the cylindrical heated body 20, and the material 24 contained central to the heated body is not utilized for the generation of heat. This phenomenon is often referred to as "skin effect".

Within this art, the depth where current density in the load drops to a value of 37% of its maximum is called the penetration depth ($\delta$). As a simplifying assumption, all of the current in the load can be safely assumed to be within the penetration depth. This simplifying assumption is useful in calculating the resistance of the current path in the load. Since the load has inherent resistance to current flow, heat will be generated in the load. The amount of heat generated (Q) is a function of the product of resistance (R) and the eddy current (I) squared and time (t), $Q=I^2Rt$.

The depth of penetration is one of the most important factors in the design of an induction heating system. The general formula for depth of penetration $\delta$ is given by:

$$\delta = \sqrt{\rho / \pi \mu \mu_v f}$$

where
 $\mu_v$=magnetic permeability of a vacuum
 $\mu$=relative magnetic permeability of the load
 $\rho$=resistivity of the load
 f=frequency of alternating current Thus, the depth of penetration is a function of three variables, two of which are related to the load. The variables are the electrical resistivity of the load $\rho$, the magnetic permeability of the load $\mu$, and the frequency f of the alternating current in the coil. The magnetic permeability of a vacuum is a constant equal to $4\Pi \times 10^{-7}$ (Wb/A m).

A major reason for calculating the depth of penetration is to determine how much current will flow within the load of a given size. Since the heat generated is related to the square of the eddy current ($I^2$), it is imperative to have as large a current flow in the load as possible.

In the prior art, induction heating coils are almost exclusively made of hollow copper tubes with water cooling running therein. Induction coils, like resistive heaters, exhibit some level of resistive heat generation. This phenomenon is undesirable because as heat builds in the coil it effects all of the physical properties of the coil and directly impacts heater efficiency. Additionally, as heat rises in the coil, oxidation of the coil material increases and this severely limits the life of the coil. This is why the prior art has employed means to draw heat away from the induction coil by use of a fluid transfer medium. This unused heat, according to the prior art, is wasted heat energy which lowers the overall efficiency of the induction heater. In addition, adding active cooling means like flowing water to the system greatly increases the system's cost and reduces reliability. It is therefore advantageous to find a way to utilize the resistive heat generated in an induction coil which will reduce overall heater complexity and increases the system efficiency.

According to the prior art, various coatings are used to protect the coils from the high temperature of the heated workpiece and to provide electrical insulation. These coatings include cements, fiberglass, and ceramics.

Induction heating power supplies are classified by the frequency of the current supplied to the coil. These systems can be classified as line-frequency systems, motor-alternating systems, solid-state systems and radio-frequency systems. Line-frequency systems operate at 50 or 60 Hz which is available from the power grid. These are the lowest cost systems and are typically used for the heating of large billets because of the large depth of penetration. The lack of frequency conversion is the major economic advantage to these systems. It is therefore advantageous to design an induction heating system that will use line frequencies efficiently, thereby reducing the overall cost of the system.

U.S. Pat. No. 5,799,720 to Ross et al. shows an inductively heated nozzle assembly for the transferring of molten metal. This nozzle is a box-like structure with insulation between the walls of the box and the inductive coil. The molten metal flowing within the box structure is heated indirectly via the inductive coil.

U.S. Pat. No. 4,726,751 to Shibata et al. discloses a hot-runner plastic injection system with tubular nozzles with induction heating windings wrapped around the outside of the nozzle. The windings are attached to a high frequency power source in series with one another. The tubular nozzle itself is heated by the inductive coil which in turn transfers heat to the molten plastic.

U.S. Pat. No. 5,979,506 to Aarseth discloses a method and system for heating oil pipelines that employs the use of heater cables displaced along the periphery of the pipeline. The heater cables exhibit both resistive and inductive heat generation which is transmitted to the wall of the pipeline and thereby to the contents in the pipeline. This axial application of the electrical conductors is being utilized primarily for ohmic heating as a resistor relying on the inherent resistance of the long conductors (>10 km). Aarseth claims that some inductive heating can be achieved with varying frequency of the power supply from 0–500 Hz.

U.S. Pat. No. 5,061,835 to Iguchi discloses an apparatus comprised of a low frequency electromagnetic heater utilizing low voltage electrical transformer with short circuit secondary. Arrangement of the primary coil, magnetic iron core and particular design of the secondary containment with prescribed resistance is the essence of this disclosure. The disclosure describes a low temperature heater where conventional resinous molding compound is placed around primary coil and fills the space between iron core and secondary pipe.

U.S. Pat. No. 4,874,916 to Burke discloses a structure for induction coil with a multi-layer winding arranged with transformer means and magnetic core to equalize the current flow in each winding throughout the operational window. Specially constructed coil is made from individual strands and arranged in such a way that each strand occupies all possible radial positions to the same extent.

U.S. Pat. No. 2,163,993 to Dufour discloses an electrical conductor wrapped around an article to be heated, and heating done by both resistively and inductively. However, since the coil is on the outside of the article, and there is no part of the article outside of the coil, the magnetic circuit is not closed around the coiled conductor. Also, since there is no part of the article outside of the coiled conductor, some of the resistance heat generated in the conductor is transferred to the surrounding air rather than to the article it surrounds.

British patent 772,424 to Gilbert discloses one or more coils each consisting of a plurality of concentric windings disposed around the cylinder and enclosed in a two piece shell or casing which is also made of magnetizable material and is clamped around the cylinder for an extrusion or injection molding system. The coils inductively heat the cylinder and the shell. There is no disclosure of resistive heating by the coils, nor any detail of the coil construction.

There is a need for an improved heating apparatus that utilizes both the inductive and resistive heat generated from a heating coil located inside the heating apparatus to optimize use of the heat generated therein.

SUMMARY OF INVENTION

An apparatus is provided for heating a flowable material. The apparatus comprises a core having a passageway formed therein for the communication of the flowable material, and an electric element coiled in multiple turns against the core in a helical pattern. The electric element, in use, heats the core both resistively and inductively. The electric element has no auxiliary cooling capacity.

The core is preferably made of ferromagnetic material and has a helical groove in which the electric element is installed. A yoke, also preferably of ferromagnetic material, is preferably provided around the core and electric element. The yoke may be a sleeve installed or the core, or it may be a metallic material deposited on the core.

The Electric element may conform to the groove when installed, and preferably has an outer surface flush with the outer surface of the core.

The core may have a wear-resistant liner, and the electric element may be embedded in the liner and against the inside surface of the core. The liner may be formed by hot-spray technology and finished to form a smooth bore through which the flowable material passes.

BRIEF DESCRIPTION OF THE DRAWINGS

FIG. 5 is a table comparing design criteria of resistive heating, inductive heating and the heating method in accordance with the present invention.

DETAILED DESCRIPTION

Figure 1:
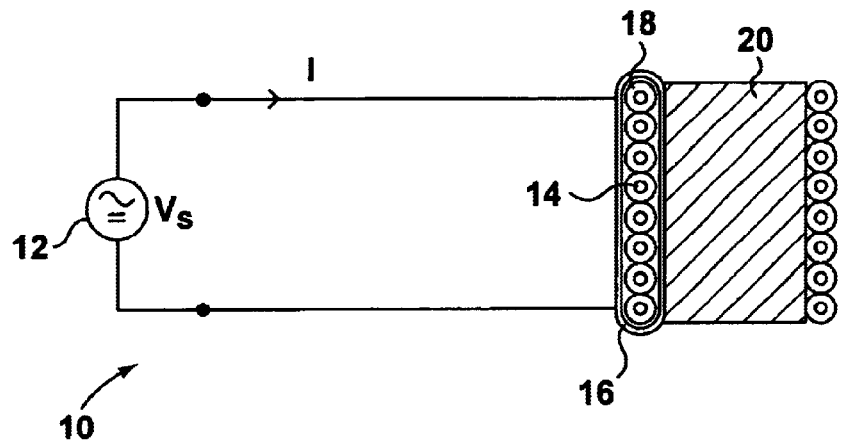
FIG. 1 is a simplified schematic representation of resistive heating as known in the art.
Figure 2:
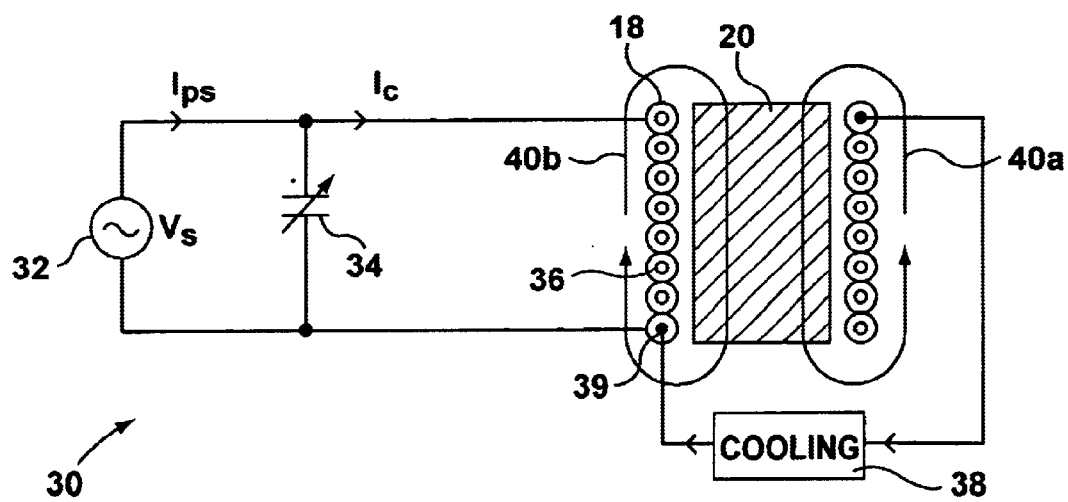
FIG. 2 is a simplified schematic representation of inductive heating as known in the art.
Figure 3:
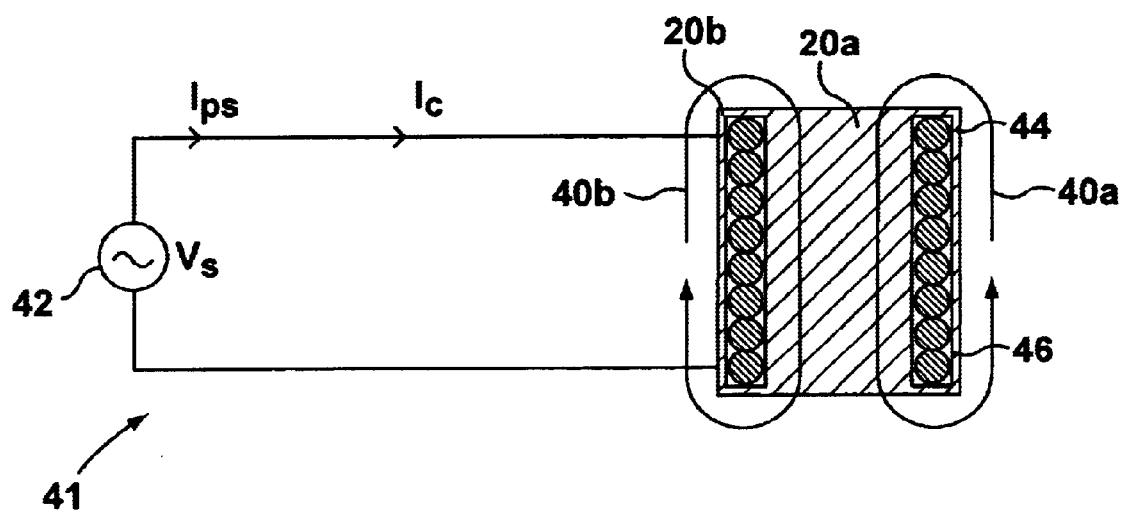
FIG. 3 is a partially schematic representation showing a heating element according to the present invention.
Figure 3A:
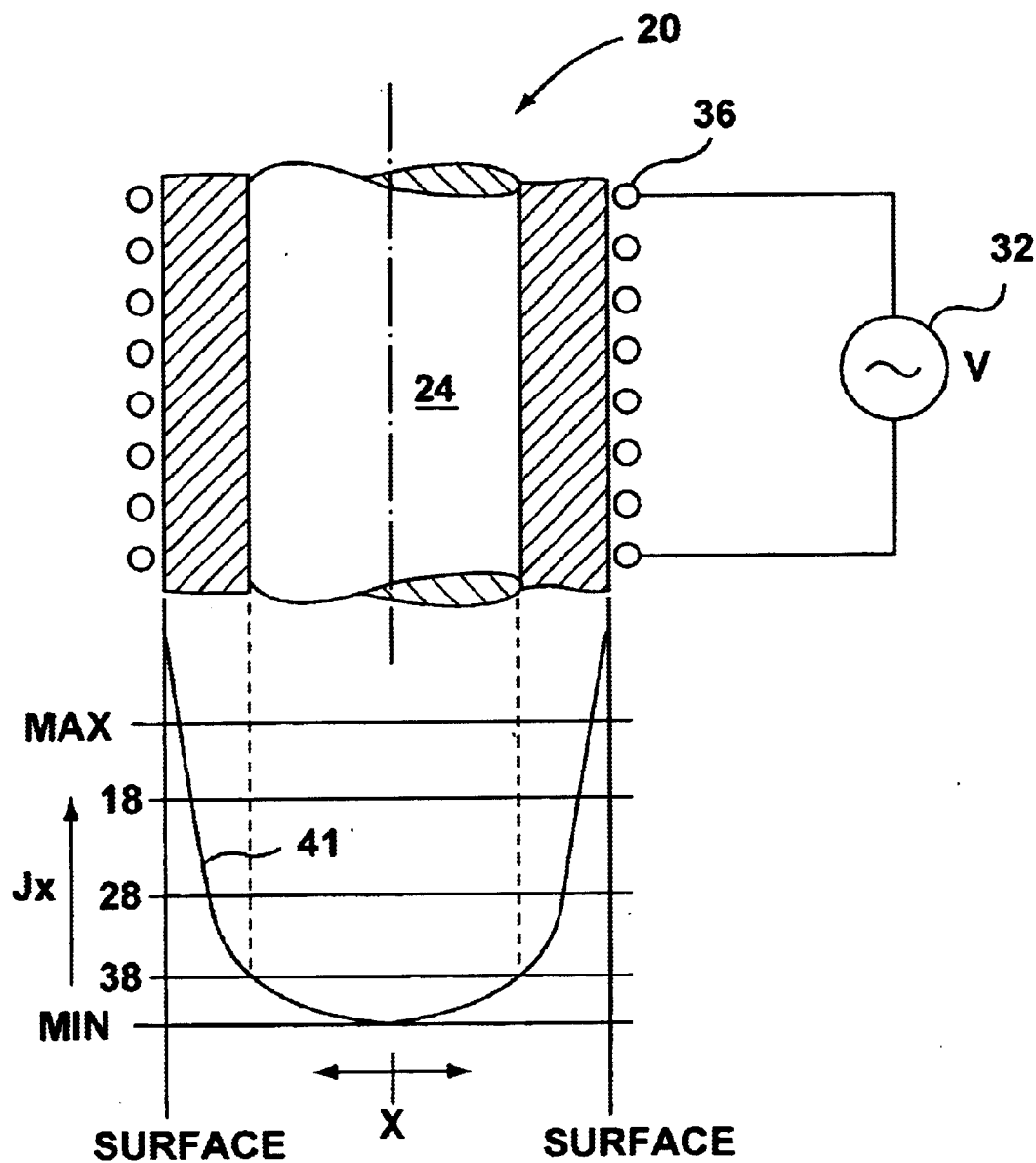
FIG. 3A is a graphical representation of the "skin effect" in the conductor of an induction type heater coil.

Referring to FIG. 3, a simplified schematic of an exemplicative embodiment 41 of the present invention is generally shown. A power supply 42 provides an alternating current to a heater coil 44 that is wrapped around and in communication with bodies 20a and 20b. In the preferred embodiment, and not by limitation, the coil 42 is placed within a groove 46 formed between bodies 20a and 20b which forms a closed magnetic structure. When an alternating current is applied to the coil 44, magnetic lines of flux are generated as shown by arrows 40a and 40b. It should be noted, that a plurality of magnetic lines of flux are generated around the entire periphery of the bodies, and the two lines shown, 40a and 40b, are for simplification. These magnetic lines of flux generate eddy currents in the bodies 20a and 20b, which generates heat in accordance with the skin-effect principles described previously. In the preferred embodiment, the body 20a and 20b can be optimally designed to maximize the magnetic lines of flux 20a and 20b to generate the most heat possible. In addition, the coil 44 is in thermal communication with the bodies 20a and 20b so that any resistive heat that is generated in the coil 44 is conducted to the bodies.

Figure 3B:
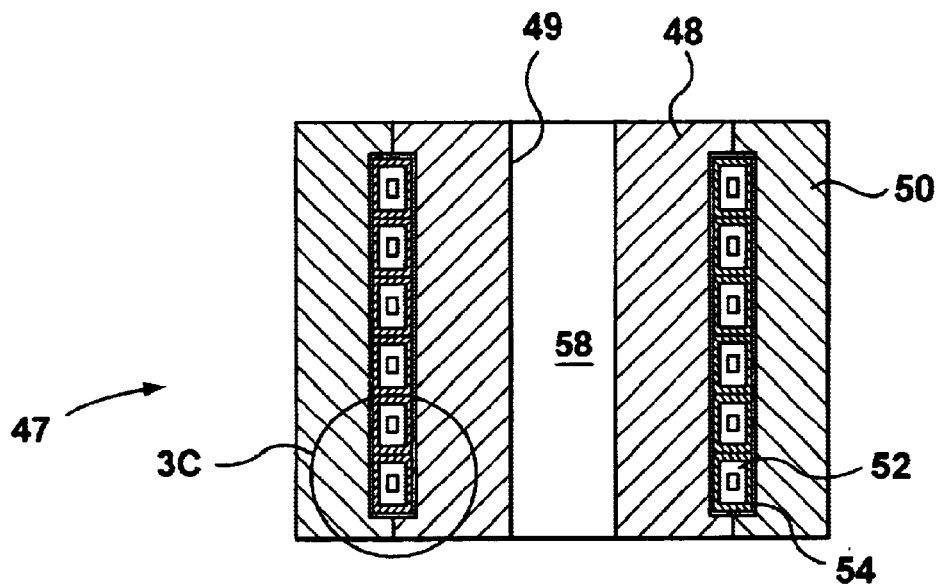
FIG. 3B is a cross-sectional view of a preferred embodiment of the present invention.
Figure 3C:
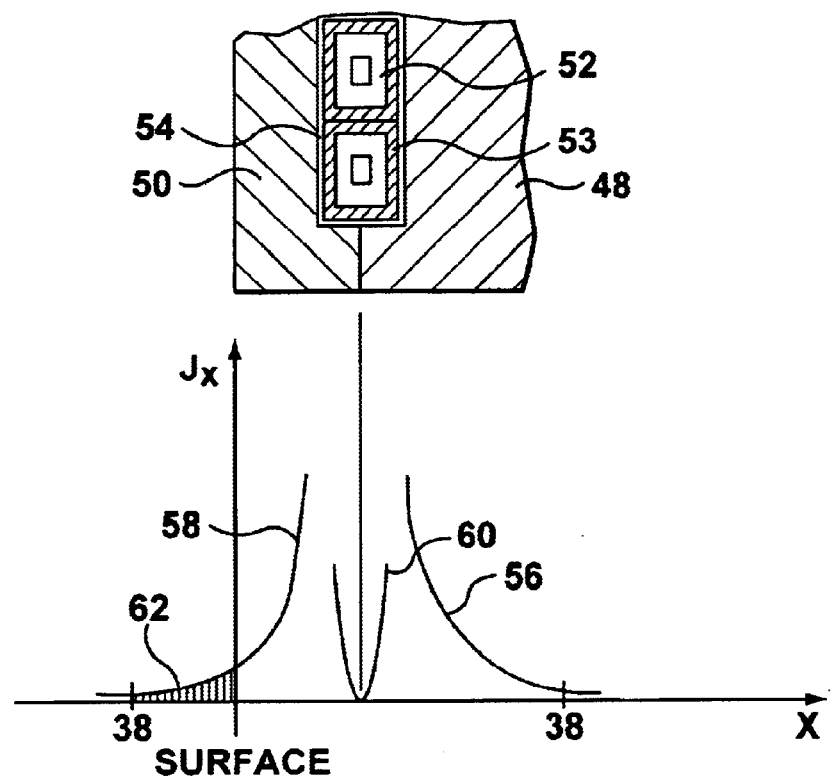
FIG. 3C is a detail view of the portion of FIG. 3B showing the current density distribution in each component.

Referring now to FIGS. 3B and 3C, another exemplicative preferred embodiment 47 of the present invention is generally shown. Although cylinders are primarily shown and discussed herein, it is to be understood that the use of the term cylinder or tube in this application is by no means to be limited to circular cylinders or tubes; it is intended that these terms encompass any cross-sectional shape. Furthermore, although the electrical circuit arrangements illustrated all employ direct or ohmmic connection to a source of electric power, it is to be understood that the invention is not so limited since the range of its application also includes those cases where the electric power source is electrically coupled to the heating element inductively or capacitively.

A heater coil 52 is wrapped in a helical fashion around a core 48. In the preferred embodiment, the heater coil 52 is made from solid metallic material like copper or other non-magnetic, electrically and thermally conductive material. Alternatively, the coil could be made from high resistance high temperature alloy. Use of the conductors with low resistance will increase inductive power rate that may be useful in some heating applications. One wire construction that can be used for low resistance coil is litz wire. Litz wire construction is designed to minimize the power losses exhibited in solid conductors due to skin effect. Skin effect is the tendency of the high frequency current to concentrate at the surface of the conductor. Litz construction counteracts this effect by increasing the amount of surface are without significantly increasing the size of the conductor. Litz wire is comprised of thousands of fine copper wires, each strand on the order of 0.001 inch in diameter and electrical insulation applied around each strand so that each strand acts as an independent conductor.

An inside wall 49 of the core 48 defines a passageway 58 for the transfer of a fluid or solid material which is to be heated. In the preferred embodiment, and by way of example only, the fluid material could be a gas, water, molten plastic, molten metal or any other material. A yoke 50 is located around and in thermal communication with the heater coil 52. In the preferred embodiment the yoke 50 is also made preferably (but not exclusively) from a ferromagnetic material. The coil 52 may be placed in a groove 54 that is provided between the core 48 and yoke 50. The core 48 and yoke 50 are preferably in thermal communication with the heater coil 52. To increase heat transfer between the heater coil 52 and the core or yoke, a suitable helical groove may be provided in at least the core or yoke to further seat the heater coil 52 and increase the contact area therein. This increased contact area will increase the conduction of heat from the heater coil 52 to the core or yoke.

An alternating current source (not shown) of a suitable frequency is connected serially to the coil 52 for communication of current therethrough. In the preferred embodiment, the frequency of the current source is selected to match the physical design of the heater. Alternatively, the frequency of the current source can be fixed, preferably around 50–60 Hz to reduce the cost of the heating system, and the physical size of the core 48 and/or yoke 50 and the heater coil 52 can be modified to produce the most efficient heater for that given frequency.

The application of alternating current through the heater coil 52 will generate both inductive and resistive heating of the heater coil 52 and create heat in the core 48 and yoke 50 by generation of eddy currents as described previously. The diameter and wall thickness of the core 48 is selected to achieve the highest heater efficiency possible and determines the most efficient coil diameter. Based on the method to be described hereinafter, the heater coil diameter is selected based on the various physical properties and performance parameters for a given heater design.

Referring to FIG. 3C, an enlarged cross-section of the heater coil 52 is shown with a graphical representation of the current density in the various components. The heater coil 52 is traversed along its major axis or length by a high frequency alternating current from the alternating current source. The effect of this current flow is to create a current density profile as shown in FIG. 3C along the cross section of the heater coil 106. As one skilled in the art will clearly see, the curves 58, 60 and 56 each represent the skin-effect within each of the components. For the coil 52, the coil exhibits a current density in the conductor cross section as shown in trace 60 that is a maximum at the outer edge of the conductor and decreases exponentially towards the center of the conductor.

Since the present invention places the heater coil 52 between the ferromagnetic core 48 and yoke 50, the skin effect phenomenon will also occur in these components. FIG. 3C shows the current density profile within a cross sectional area of the yoke and the core. As mentioned previously, for all practical purposes, all induced current is contained with an area along the skin of each component at a depth equal to 3δ. Curve 56 shows the current density that is induced in core 48. At a distance 3δ from the center of the coil, essentially 100% of the current is contained in the core and acts to generate heat. Curve 58 however shows the current density in the yoke 50, where a portion of the current depicted by shaded area 62 is not contained in the yoke, and as such is not generating heat. This lost opportunity to generate heat energy reduces the overall heater efficiency.

For this method of heating, various parameters of the heater design can be analyzed and altered to produce a highly efficient heater. These parameters include:

$I_{coil}$=heater coil current
n=number of turns of heater coil
d=coil wire diameter
$R_o$=heater coil radius
I=length of coil
$\rho_{coil}$=specific resistance of heater coil
$c_{coil}$=specific heat of heater coil
$Y_{coil}$=density of coil
$h_y$=thickness of the outer tube
$D_h$=melt channel diameter
$\mu_{substrate}$=substrate magnetic permeability
$c_{substrate}$=substrate specific heat
$Y_{substrate}$=substrate specific density
f—frequency of alternating current
ΔT—temperature rise The electrical specific resistance of the coil ($\rho_{coil}$) and coil physical dimensions (n, d, $R_o$, I) are major contributors to the creation of resistive heat energy in the coil. Heretofore, the prior art considered this heat generation as unusable and used several methods to mitigate it. Firstly using Litz wire to reduce resistive heat generation and second to cool the coil with suitable coolant. As a result, heaters do not operate at peak efficiency.

With this in mind, the present invention harnesses all of the energy in the induction coil and harness this energy for process heating. To effectively transfer all of the energy of the coil to the process we will select the material and place the induction coil within the substrate at the optimal location (or depth) that will be based on an analysis of the process heating requirements, mechanical structure requirements, and speed of heating.

In a preferred embodiment of the present invention, as shown for example in FIG. 3B, the coil 52 material can be Nichrome, which has a resistance that is six times higher than copper. With this increased resistance, we can generate six times more heat than using copper coil as suggested in prior art. In pure induction heating systems, commonly used high frequency induction heating equipment would not be able to operate under increased heater resistance. Power supplies known today operate on minimum coil resistance which supports the resonant state of the heating apparatus. Typically, according to the prior art, an increase in coil resistance will significantly decrease the efficiency of the heating system.

The coil 52 must be electrically insulated from the core and yoke to operate. So, a material providing a high dielectric insulating coating 53 around the coil 52 must be provided. Coil insulation 53 must also be a good thermal conductor to enable heat transfer from the coil 52 to the yoke and core. Materials with good dielectric properties and excellent thermal conductivity are readily available. Finally, coil 52 must be placed in the intimate contact with the heated core and yoke. Dielectrics with good thermal conductivity are commercially available in solid forms as well as in forms of powders and as potting compounds. Which form of dielectric to use is up to the individual application.

Total useful energy generated by the coil 52 installed within the yoke and core is given by the following relationship:

$$P_{combo}=Q_{(resistive)}+Q_{(inductive)}$$
$$P_{combo}=I_c^2 R_c + I_{ec}^2 R_{ec}$$

Where:
Q=heat energy
$P_{combo}$=Rate of energy generated by combination of inductive and resistive heating
$I_c$=total current in the heating coil
$R_c$=Induction coil resistance
$I_{ec}$=total equivalent eddy current in the heated article
$R_{ec}$=equivalent eddy current resistance in heated article The second part of the above equation is the inductive contribution as a result of the current flowing through the coil and inducing eddy currents in the core and yoke. Since the coil 52 is placed between the core 48 and the yoke 50, we have no coupling losses and therefore maximum energy transfer is achieved. From the energy equation it can be seen that the same coil current provides more heating power in comparison with pure resistive or pure inductive method. Consequently, for the same power level, the temperature of the heater coil can be significantly lower than compared to pure resistive heating. In contemporary induction heating all of the energy generated as ohmic losses in the induction coil is removed by cooling, as discussed previously.

In cases of structural part heating, reduction of thermal gradients in the part is important. Resistive and inductive heating generates thermal gradients and combination of both heating means reduce thermal gradients significantly for the same power rate. While resistive heating elements may reach a temperature of 1600° F., the heated article may not begin to conduct heat away into sub-surface layers for some time. This thermal lag results in large temperature gradients at the material surface. Significant tensile stress exists in the skin of the heated article due to dynamic thermal gradients. Similarly, induction heating only creates heat in a thin skin layer of the heated article at a high rate. These deleterious effects can be significantly diminished by combining together the two separate heating sources in accordance with the present invention which in turn results in evening out temperature gradients and therefore reducing local stress level.

Referring now to FIG. 5, which shows a table comparing the various design criteria for each method of heating previously discussed, the reader can quickly appreciate the advantages associated with using the combination of inductive and resistive heating in accordance with the present invention. According to the present invention, more heat energy is generated with less energy loss without the use of auxiliary cooling and without the use of a resonance filter. As a result, the time to heat up a given article is less and is achieved in a more controlled manner depending on the heater coil design.

Figure 4:
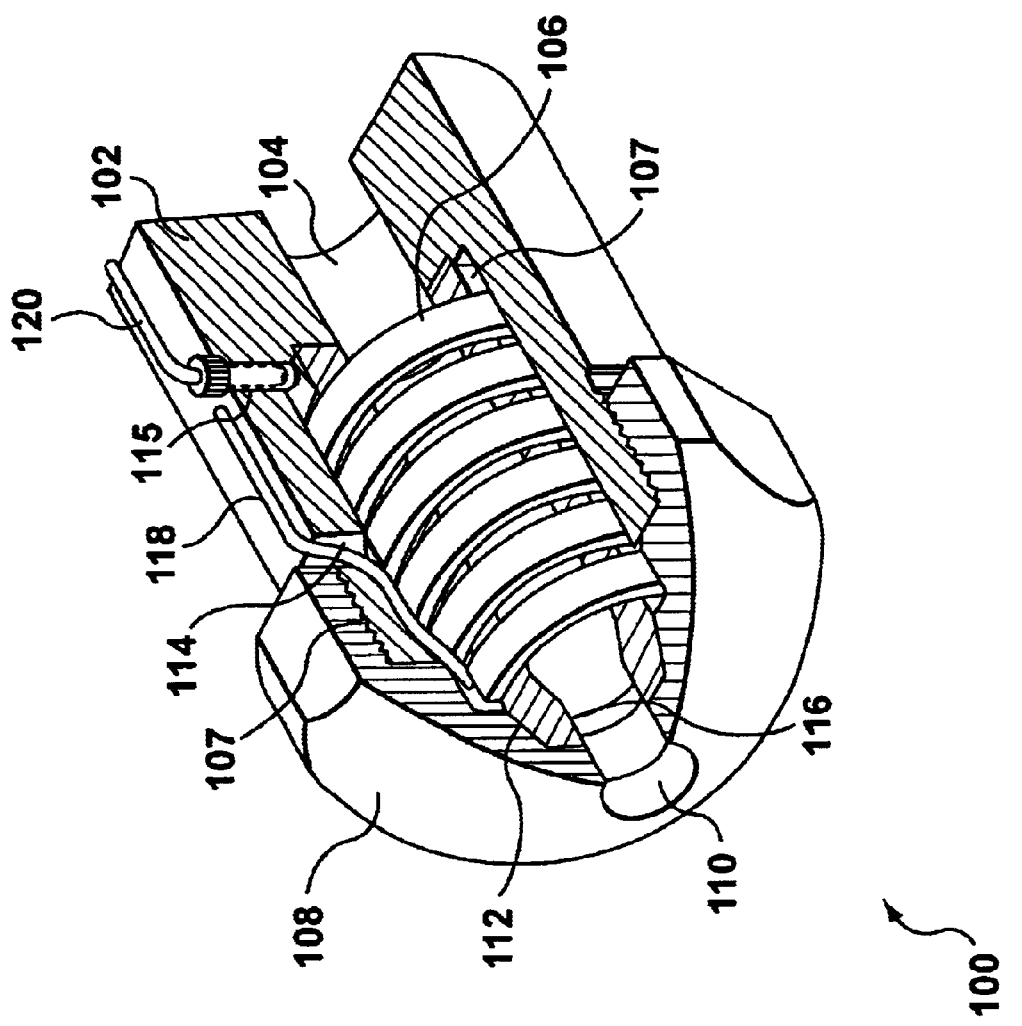
FIG. 4 is a partial cross-sectional isometric view of an embodiment of the present invention as applied to a nozzle for an injection molding machine.
Figure 4A:
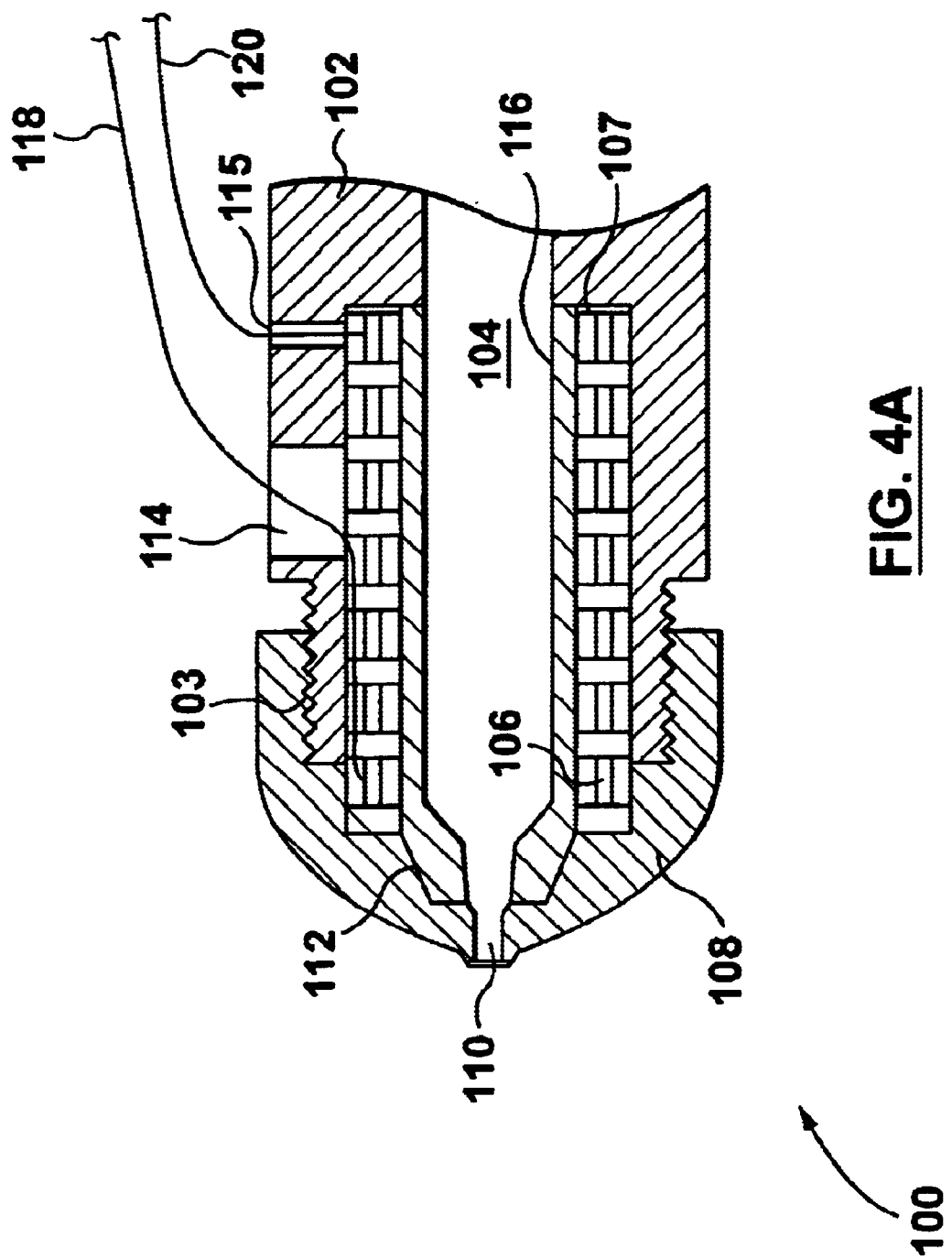
FIG. 4A is a cross-sectional view of the embodiment shown in FIG. 4.

Referring now to FIGS. 4 and 4A, another exemplicative preferred embodiment of the present invention is generally shown as applied to a nozzle 100. It should be noted, the current figures show a typical arrangement for injection molding metals such as magnesium, but numerous other arrangements for injection molding materials such as plastic could easily be envisioned with very little effort by those skilled in the art.

The heated nozzle 100 is comprised of an elongated outer piece 102 (the equivalent of the yoke) having a passageway 104 formed therein for the communication of a fluid. The fluid could be molten metal such as for example magnesium, plastic or other like fluids. In a preferred embodiment, the fluid is a magnesium alloy in a thixotropic state. In a preferred embodiment, threads 103 are provided at a proximal end of the outer piece 102 which interfaces with threads formed on a nozzle head 108. Nozzle head 108 is rigidly affixed to the outer piece 102 and an inner piece 116 (equivalent to the core) is inserted between the head 108 and the outer piece 102. The passageway 104 continues through inner piece 116 for communication of the fluid to an outlet 110. An annular gap 107 is provided between inner piece 116 and outer piece 102 for insertion of a heater coil 106. In this preferred embodiment, a taper 112 is provided between the nozzle head 108 and the inner piece 116 to insure good mechanical connection. Electrical conductors 118 and 120 are inserted through grooves 114 and 115 respectively for connection to the heater coil 106. The heater coil 106 is preferably provided with an electrically insulative coating as described previously.

As shown by the figures, with this arrangement, the heater coil 106 has been sandwiched between a ferromagnetic inner piece 116 and a ferromagnetic outer piece 102 which forms a closed magnetic circuit around the coil. Preferably, the heater coil 106 is in physical contact with both the inner piece 116 and the outer piece 102 for increased heat conduction from the coil. But a slight gap between the heater coil 106 and the inner and outer piece would still function properly.

In the preferred embodiment, alternating current is communicated through the heater coil 106 thereby generating inductive heat in the outer piece 102 and the inner piece 116 and the nozzle head 108 as well. Current flowing through coil 106 will also create resistive heat in the coil itself which will be conducted to the inner and outer pieces. In this arrangement, little or no heat energy is lost or wasted, but is directed at the article to be heated.

Figure 6:
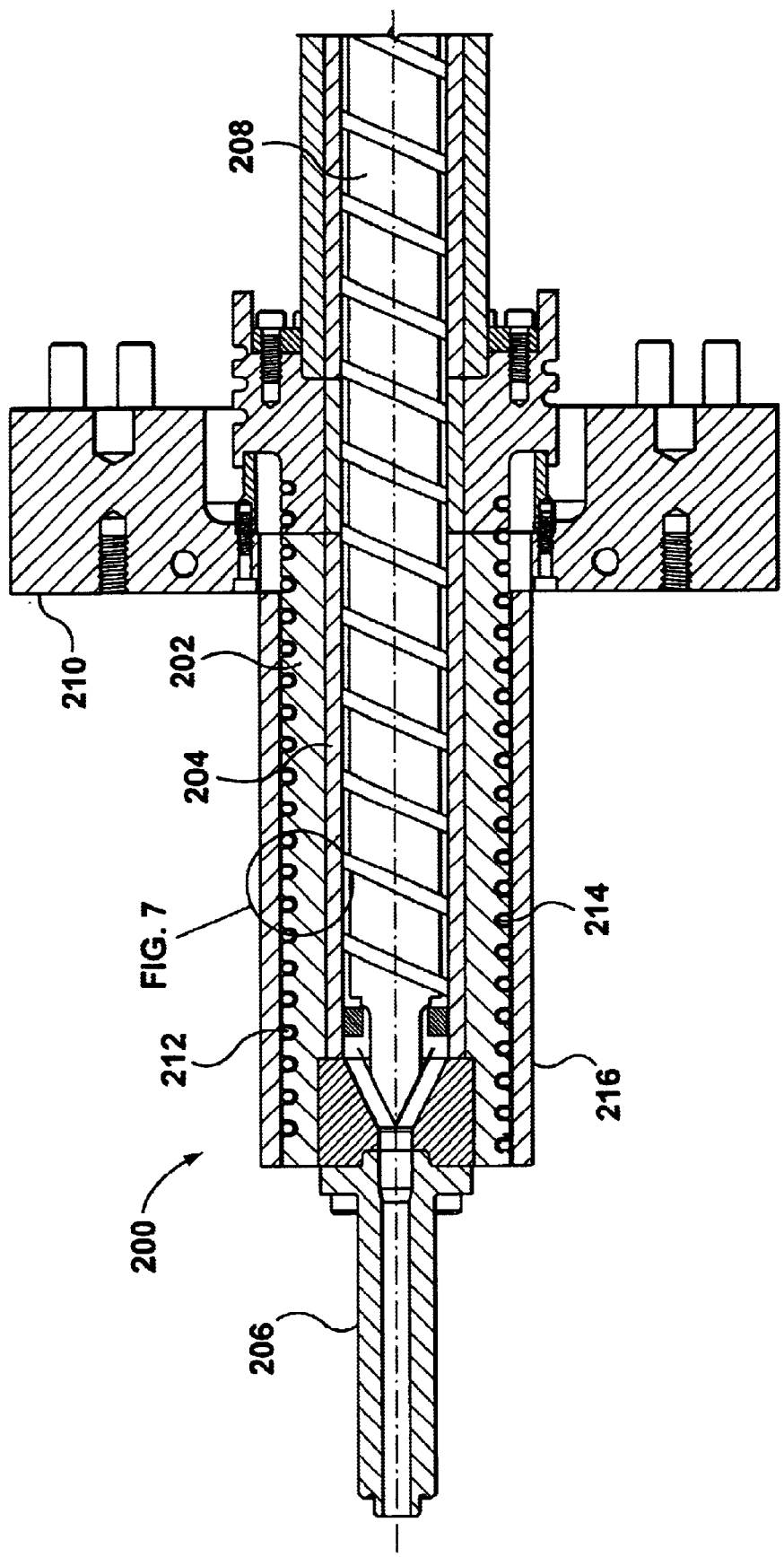
FIG. 6. is a cross sectional view of another embodiment of the present invention applied to a barrel for an injection molding machine.

Referring now to FIG. 6, another exemplicative preferred embodiment of the present invention is generally shown as applied to a barrel assembly 200 for a machine that processes molten material, such as an extruder or injection molding machine. The barrel assembly 200 for extruders or injection molding machines typically include a barrel portion 202 with an optional where-resistant liner 204, a nozzle 206, a screw 208, and a mount 210 which connects the barrel assembly 200 to the processing machine.

The present invention installs an electric element 212 in a coiled configuration in or on the barrel portion 202 (equivalent of the core). In the embodiment illustrated in FIG. 6, electric element 212 is installed in at least one helical groove 214 formed along the outside of barrel portion 202. Sleeve 216 (equivalent of the yoke) may optionally be installed over barrel portion 202 to help retain electric element 212 in the at least one groove 214. Alternatively, the helical groove could be formed along the inside of the barrel portion, and electric element installed in it. However such an arrangement is more difficult to manufacture and assemble. The barrel portion 202, liner 204, screw 208, and sleeve 216 are all preferably made of ferromagnetic materials so that they can readily form a preferred magnetic structure for low-frequency heating applications up to 400 Hz. Alternatively these components could be made from highly conductive ceramics or graphite materials. Helical groove 214 may have variable axial pitch to provide a desired thermal profile along barrel portion 202. Groove 214 may have a single electric element 212 along barrel portion 202, or a plurality of coiled electric elements 212, with each coil located axially adjacent another coil to provide discrete heating zones that can be controlled individually. Each coil could operate on a slightly different frequency to prevent interference among coils.

Figure 8:
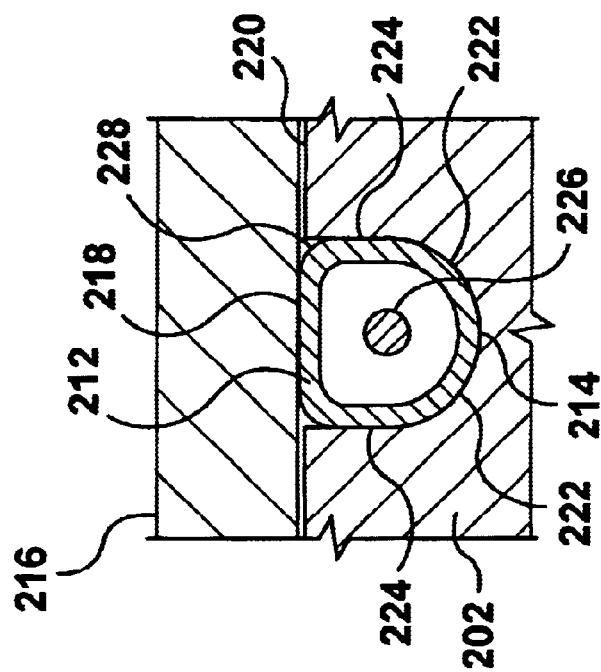
FIG. 8 is a detail view of a portion of FIG. 7 showing detail of the electrical element.
Figure 7:
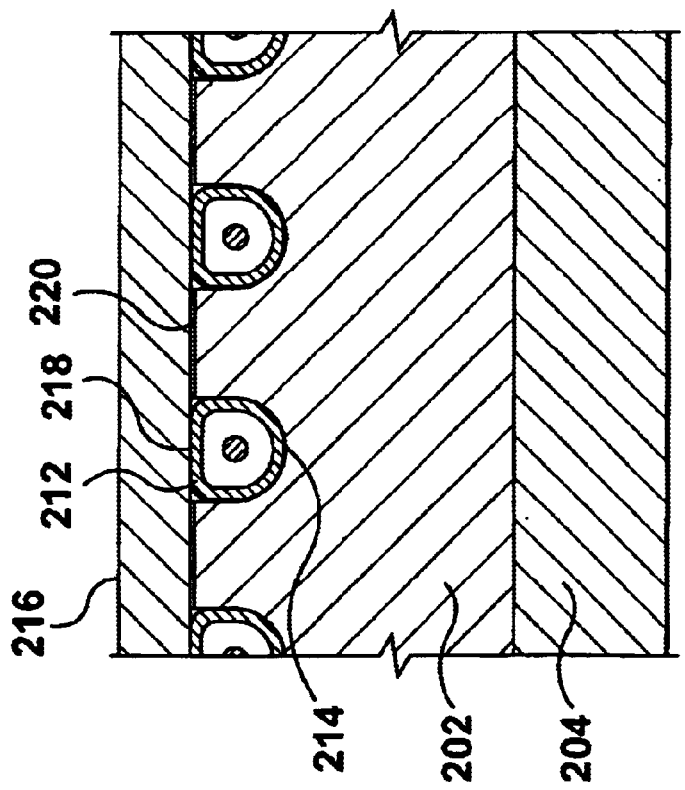
FIG. 7 is a detail view of a portion of FIG. 6.

Referring to FIGS. 7 and 8, showing a more detailed views of a portion of the barrel portion 202 with the groove 214 and electric element 212, groove 214 is formed in an outer surface of barrel portion 202 such that when electric element 212 is installed in the groove 214, preferably the outer surface 218 of electric element 212 will be approximately even with the outside surface 220 of barrel portion 202. This is accomplished by deforming electric element 212 when it is installed in groove 214 such that electric element 212 conforms to the shape of groove 214. Electric element 212 is a coaxial structure preferably initially having a round cross-section. Electric elements that have square, rectangular other cross-sectional shapes are also suitable.

Electric element 212 comprises a conductor 226, preferably a material having high resistivity, such as nickel-chromium, surrounded by an electrically insulative material that is also thermally conductive, preferably a highly compacted mineral powder, such as magnesium oxide. A metallic sheath 228 encloses the insulative material and conductor. One such electric element is sold under the tradename THERMOCOAX from Thermocoax of Suresnes Cedex, France.

Groove 214 preferably has radiused internal corners 222 and vertical sides 224. When electric element 212 is pressed into groove 214, sheath 228 deforms to substantially conform to the shape of groove 214, and the outer surface is flattened to approximately align with the outer surface 220 of the barrel portion 202. Outer portion 218 may preferably protrude slightly beyond outer surface 220 to the to insure good contact between sleeve 216 and outer surface 218. Sleeve 216 may be shrink-fit onto barrel portion 202, thereby firmly pressing electric element 212 into groove 214. Alternatively, sleeve 216 may be two C-shaped portions clamped together. However, it has been found that electric element 212 will stay in groove 214 without sleeve 216.

Figure 9:
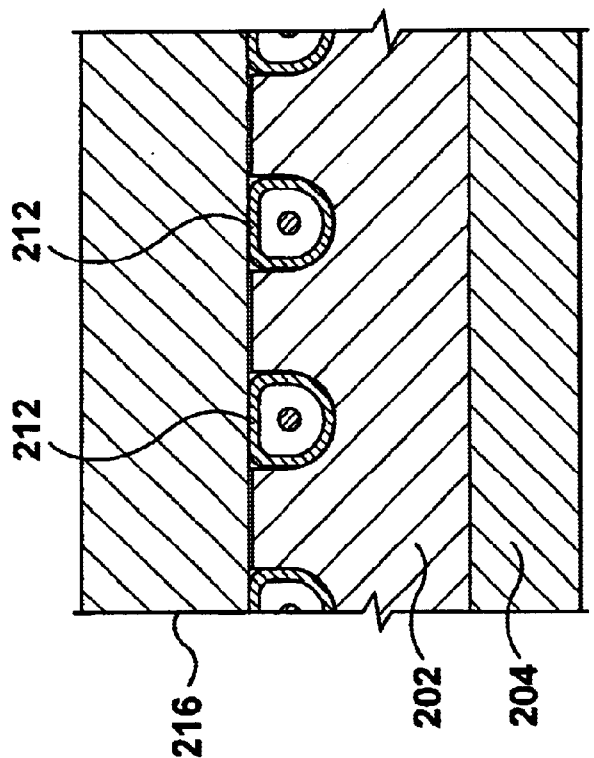
FIG. 9 is the view of FIG. 7 showing another embodiment of the present invention.

Sleeve 216 may or may not bear a significant radial load generated by the pressure of the material processed inside barrel assembly 200. As shown in FIGS. 7 and 8, sleeve 216 may be very thin relative to barrel portion 202 and may only serve the purpose to restrain electric element 212. As illustrated in FIG. 9, sleeve 216 may alternatively have substantial thickness and bear significant radial load. In this embodiment sleeve 216 has approximately the same thickness as barrel portion 202. This embodiment locates element 212 deeper inside the wall of barrel assembly 200. Such a location has advantages of more efficiently using the inductive energy to heat barrel assembly 200 since the magnetic field extending outward from electric element 212 engages metal structure (sleeve 216) for more of its penetration depth. Also, since electric element 212 is closer to the screw 208, it can more effectively heat at higher frequencies than in the embodiment where electric element 212 is located farther out where lower frequencies are required for increased depth of penetration.

Figure 10:
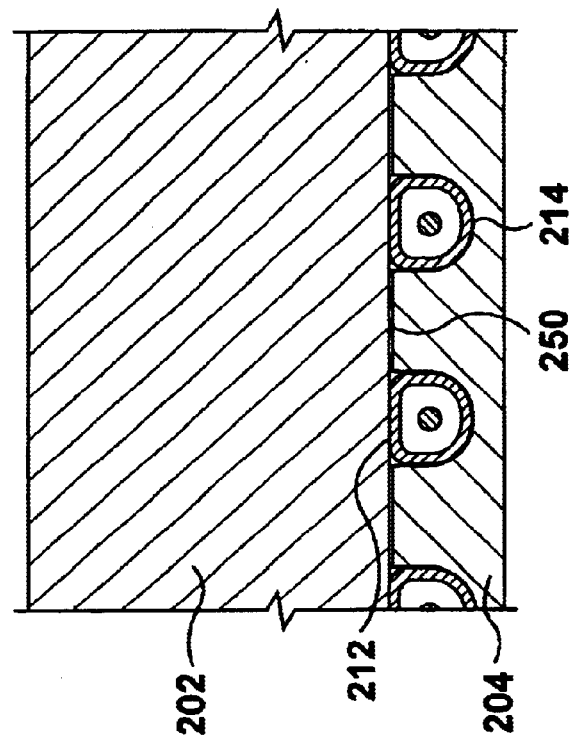
FIG. 10 is the view of FIG. 7 showing still another embodiment of the present invention.

Referring to FIG. 10, and in another embodiment of the invention electric element 212 may be installed in liner 204. The advantage of this embodiment is that the structural barrel portion, 202 remains smooth with no grooves to concentrate stresses. The liner 204 could be a tubular element with a helical groove into which electric element 212 is installed. Barrel portion 202 covers electric element 212 in a similar manner as sleeve 216 does in the previous embodiments. Alternatively, the electric element 212 can be formed to a coiled shape and installed against the inner surface 250 of core 202. Then an appropriate wear-resistant liner material can be deposited, such as by hot-spray technology, over the electric element and inner surface 250 to form liner 204 and built to a sufficient thickness such that the inner surface of liner 204 can be finished to form a smooth bore through which passes the flowable material being processed in the barrel assembly. This is the best mode of the invention because the electric element 212 is placed closest to the screw 208 (shown in FIG. 6) to inductively heat it and material being processed by it, as well as efficiently heat barrel portion 202, and fabrication is practical with current technology. Also heat is concentrated on the inside of core 202, thereby allowing the outside of core 202 to be at a lower temperature than that which the flowable material is processed.

Figure 11:
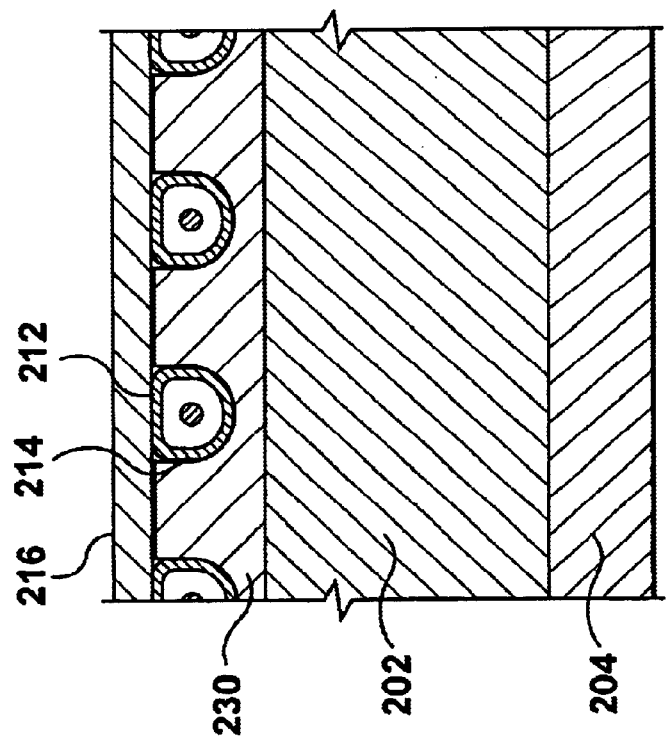
FIG. 11 is the view of FIG. 7 showing yet another embodiment of the present invention.

In the embodiment illustrated in FIG. 11 barrel portion 202 has the same advantage of having no grooves. Electric elements 212 are installed in helical groove 214 in a separate heater band 230 that is installed over barrel portion 202. Heater band 230 is preferably nonstructural. As with previous embodiments, an optional sleeve 216 may be used to retain electric element 212 in groove 214.

Figure 12:
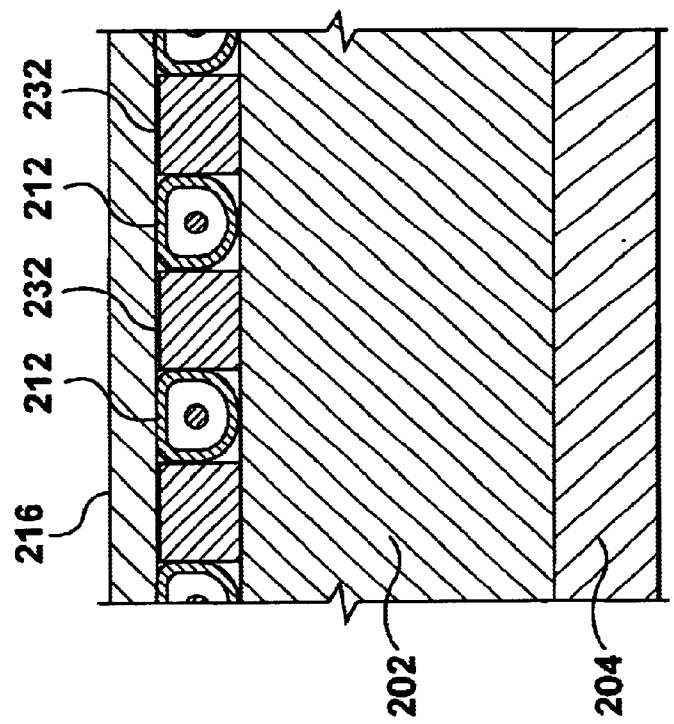
FIG. 12 is the view of FIG. 7 showing yet another embodiment of the present invention.

Similar advantages are obtained by the embodiment illustrated in FIG. 12. In this embodiment there are no grooves formed in any component. Electric element 212 is wrapped with a spacer element 232 onto barrel portion 202 and compressed to generally conform to the space between spacer element 232. Spacer element 232 may be a material such as a strip of annealed ferromagnetic material, preferably from the same family of materials as core 202. Sleeve 216 is preferred in this embodiment to retain both electric element 212 and spacer element 232 tightly against barrel portion 202 so that the spacer element and electric elements are contained between the sleeve and the core.

Figure 13:
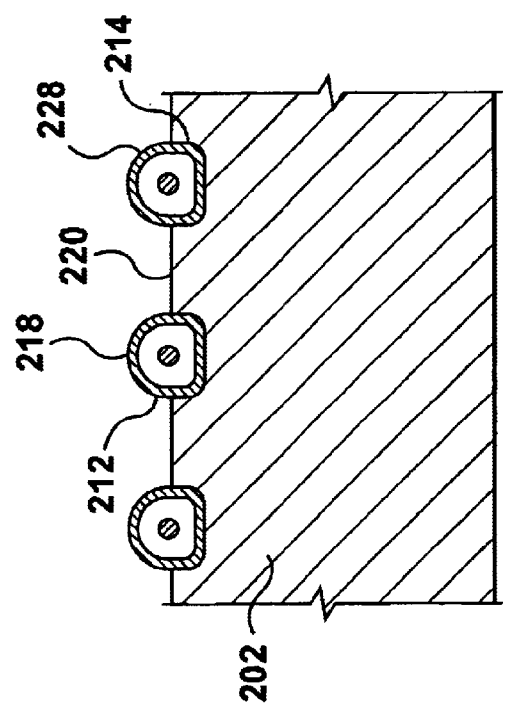
FIG. 13 is the view of FIG. 7 showing yet another embodiment of the present invention.

In another embodiment illustrated in FIG. 13, barrel portion 202 has groove 214 on its outside surface 220, but groove 214 is not deep enough to allow the outside surface 218 of electric element 212 to be substantially even with outside surface 220. Groove 214 engages a portion of the circumference of sheath 228, and preferably has a contour to which the sheath 228 conforms. Groove 214 may engage just over 180 degrees of the sheath's circumference so that sheath 228 snaps into groove 214 and is thereby retained in it. The magnetic circuit in this embodiment is closed by sheath 228. Since sheath 228 is very thin, the magnetic field is concentrated therein and not efficiently used to generate inductive heat in barrel portion 202. Also, since there is no sleeve used with this embodiment, significant resistive heat generated in electric element 212 is radiated to the air, or to an insulation layer which may optionally may be applied over barrel assembly 200. Although this embodiment may be the simplest to construct in that it has a no liner and no sleeve, and groove 214 is minimum depth, it is the least efficient. The performance of this embodiment can be improved by applying a covering over electric element 212 and outer surface 220 of barrel portion 202 to a thickness exceeding one-half the diameter of electric element 212. The covering preferably is a metallic alloy which can be applied by well-known technology, such as hot-spray processes.

Alternatively, electric element 212 may be installed,onto barrel portion 202 with no groove, and the covering of metallic alloy may then be applied to retain electric element 212 at the desired location and to improve performance.

In all of these embodiments, electric elements 212 are axially spaced some distance apart with metallic structure between them. The width of the metallic structure between electric elements 212 is preferably approximately the same as the width of electric elements 212. Electric elements 212 can be placed closer together to increase the heating density on the barrel assembly 200, but that concentrates the magnetic field between electric elements 212 thereby generating undesirable thermal gradients and decreasing the heating efficiency. It is preferable to adjust the frequency and power to the electric elements 212 to achieve the desired heating rather than decreasing the distance between the electric elements 212. The distance between electric elements 212 could be made wider, but that decreases the heat density and may require increased current and/or frequency to compensate for increased power requirements of the electric elements 212.

Figure 14:
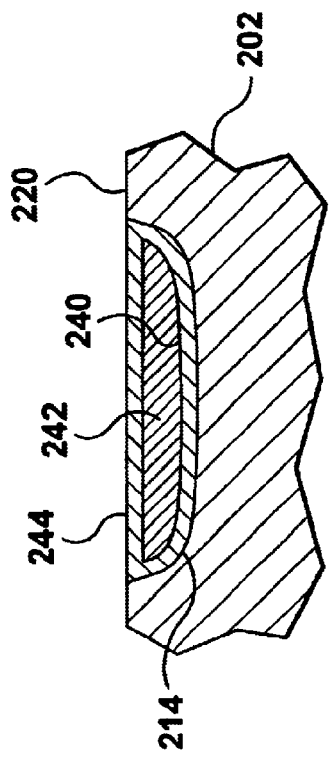
FIG. 14 is the view of FIG. 8 showing an alternative embodiment of an electrical element used in the present invention.

All of the previous embodiments use a separate electric element 212. Alternatively, as illustrated in FIG. 14, electric element 212 may be constructed integral with the barrel components using known film deposition technology. One example of technology suitable for this application is thermal spray as provided by ThermoCeramiX Inc. of Shirley. Mass. An electrical insulating layer 240 is deposited in groove 214. Then the heating element 242 is deposited over the insulating layer 240. Finally an outer insulating layer 244 is deposited over the heating element 242 to encapsulate the heating element 242. The outer insulating layer 244 is both electrically and thermally insulating, and may be machined or otherwise finished to be flush with the outside surface 220 of barrel portion 202 to accommodate a sleeve. Other film technologies available to do this includes thin film vapor deposition and thick film using inks deposited by silk screen and/or writing such as described in U.S. Pat. Nos. 5,973,296, 6,305,923, and 6,341,954, herein incorporated by reference.

Figure 15:
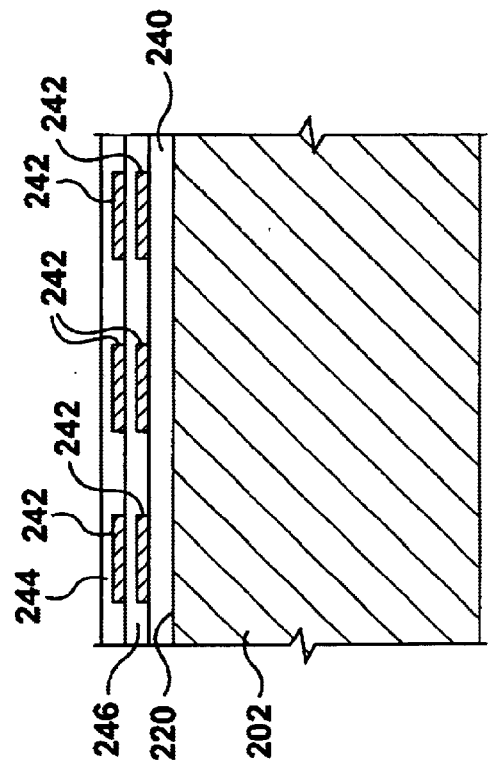
FIG. 15 is the view of FIG. 7 showing yet another embodiment of the present invention showing an alternate embodiment of electrons used in the present invention.

Referring to FIG. 15, such film technology can be used to apply electric elements onto the smooth outer surface 220 of the barrel portion 202 rather than in a groove. In this embodiment, the electrical insulating layer 240 is applied over the entire outer surface of barrel portion 202. The heating element 242 is then deposited, preferably in a helical configuration, over the insulating layer 240 to form a coil. A second insulating layer 246 is then applied over the entire surface. This layer could be the final outside layer as in the previous embodiment, or could be an intermediate layer whereby additional heating elements are deposited on top of it, preferably aligned with the previously deposited heating elements as illustrated to form a multilayered coil. This process may be repeated until the desired thickness is achieved, then a final outer insulating layer 244 is applied in may be machined as with the previous embodiment.

With all of these film deposition technologies, the heating element 242 is applied by known methods. The material applied can be formulated to have a resistivity optimized to provide the best combination of resistive and inductive heating for a particular frequency and power. If resistivity is too high, heating will be primarily resistive with low current developed for induction, if resistivity is too low, high current will flow which will produce high induction current with little resistive heating. The preferred range for resistivity for the heating element 242 is preferably within a range of $4 \times 10^{-8}$ to $10^3$ ohm-meters.

The present invention provides superior thermal management of a tubular structure minimizing thermal gradients to minimize thermally induced stresses and fatigue in the tubular structure to extend the life of the structure. The heating coil is in thermal communication with the tubular structure to inductively and resistively heat the structure and is located so as to efficiently induce heat in material and structures in the bore of the tubular structure. By adjusting the ratio between inductive heat and resistive heat produced, and positioning the coil so that heat is concentrated on the inside of the tubular structure, the outside of the tubular structure can be at a lower temperature than that which the flowable material is processed.

It will, of course, be understood that the above description has been given by way of example only and that modifications in detail may be made within the scope of the present invention. For example, the embodiments have been described in terms of heating a barrel or a nozzle for injection molding machine or extruder, but invention is intended to apply to any tubular metal device that can be heated in this manner.

What is claimed is:

1. An apparatus for heating a flowable material comprising:
   a core having a passageway formed therein for the communication of the flowable material, the core having an outer surface; and
   an electric element coiled in multiple turns against the core in a helical pattern, the electric element, in use, heating the core both resistively and inductively, the electric element having no auxiliary cooling capacity.

2. The apparatus of claim 1, wherein the outer surface of the core has at least one helical groove which receives the electric element.

3. The apparatus of claim 2, wherein the electric element has a conductor that is surrounded by an electrically insulative material that is also thermally conductive, and a metallic sheath around the insulative material.

4. The apparatus of claim 3, wherein the conductor is made of a nickel chromium alloy.

5. The apparatus of claim 3, wherein the groove has a contour and wherein at least a portion of the sheath conforms to the contour.

6. The apparatus of claim 5, wherein the groove has substantially vertical walls which cooperate with the sheath to retain electric element in the groove.

7. The apparatus of claim 2, wherein the groove is sufficiently deep such that an outer surface of the electric element is approximately even with the outer surface of the core.

8. The apparatus of claim 7, further comprising a yoke disposed around the core.

9. The apparatus of claim 8, wherein the core and the yoke are made of ferromagnetic material.

10. The apparatus of claim 8, wherein the yoke comprises a sleeve fitting tightly against the electric element.

11. The apparatus of claim 10, wherein the sleeve is substantially thinner than the core.

12. The apparatus of claim 10, wherein the sleeve is approximately the same thickness as the core.

13. The apparatus of claim 1, wherein an outer surface of the electric element extends beyond the outer surface of the core.

14. The apparatus of claim 13, wherein the outer surface of the core has at least one helical groove which receives the electric element.

15. The apparatus of claim 13, further comprising a covering made of a metallic alloy deposited on an outer surface of the electric element and the outer surface of the core.

16. The apparatus of claim 13, further comprising a spacer element applied between each turn of the coiled electrical element.

17. The apparatus of claim 16 wherein the spacer comprises an annealed ferromagnetic alloy.

18. The apparatus of claim 16, further comprising a sleeve installed over the core with the electric element and the spacer element disposed around the core so that the spacer element and electric elements are contained between the sleeve and the core.

19. The apparatus of claim 1, wherein the electrical element is deposited on the outer surface of the core, electric element comprising a first insulating layer applied to at least a portion of the outer surface of the core, a heating element deposited in a helical pattern on the first insulating layer, and a second insulating layer deposited over the heating element to encapsulate it.

20. The apparatus of claim 19, wherein the second insulating layer is finished to be flush with the outside surface of the core.

21. The apparatus of claim 20, further comprising a sleeve installed over the core.

22. The apparatus of claim 19, wherein the core has a helical groove on the outer surface and the electric element is deposited in a helical groove.

23. The apparatus of claim 19, wherein a plurality of electric elements are deposited to form a multilayered coil.

24. An apparatus for heating a flowable material comprising:
    a core having a passageway formed therein for the communication of the flowable material, the core having an inner surface and a wear-resistant liner adjacent the inner surface; and
    an electric element coiled in multiple turns against the core at the inner surface of the core, the electric element, in use, heating the core and liner both resistively and inductively, the electric element having no auxiliary cooling capacity.

25. The apparatus of claim 24, wherein the electric element is embedded in the liner and the liner comprises a covering made of a metallic alloy deposited on an inner surface of the electric element and the inner surface of the core.

26. The apparatus of claim 25, wherein the liner is finished to form a smooth bore through which the flowable material passes.

* * * * *